US005565157A

United States Patent [19]

[11] Patent Number: 5,565,157

[45] Date of Patent: Oct. 15, 1996

Sugimoto et al.

[54] METHOD OF MAKING A SPARK PLUG INSULATOR

[75] Inventors: Makoto Sugimoto; Masahiro Konishi; Hiroyuki Tanabe; Kenichi Nishikawa, all of Nagoya, Japan

[73] Assignee: NGK Spark Plug Co., Ltd., Nagoya, Japan

[21] Appl. No.: 455,307

[22] Filed: May 31, 1995

Related U.S. Application Data

[62] Division of Ser. No. 231,836, Apr. 25, 1994, Pat. No. 5,508,582.

[30] Foreign Application Priority Data

Apr. 26, 1993 [JP] Japan .................................... 5-099206

[51] Int. Cl.[6] ............................ B29C 39/00; B29D 31/00

[52] U.S. Cl. ............................................ 264/101; 264/122

[58] Field of Search ................................ 264/56, 65, 101, 264/122; 65/17.5

[56] References Cited

U.S. PATENT DOCUMENTS 4,970,095 11/1990 Bolt et al. ............................... 429/226

FOREIGN PATENT DOCUMENTS 0544952 6/1993 European Pat. Off. ........ H01T 13/38

*Primary Examiner*—Donald E. Czaja
*Assistant Examiner*—Sean Vincent
*Attorney, Agent, or Firm*—Sughrue, Mion, Zinn, Macpeak & Seas

[57] ABSTRACT

In a spark plug insulator for use in an internal combustion engine, a sintered body has boron nitride and a metal oxide, the boron nitride of the sintered body being 80% or exceeding 80% by weight, and the sintered body having a thermal expansion coefficient of less than $5.0\times10^{-6}$/°C. The metal oxide is selected alone or combination from the group consisting of magnesium oxide, calcium oxide, silicon oxide, boron oxide, yttrium oxide and aluminum oxide.

2 Claims, 3 Drawing Sheets

METHOD OF MAKING A SPARK PLUG INSULATOR

This is a divisional of application Ser. No. 08/231,836 filed Apr. 25, 1994 now U.S. Pat. No. 5,508,582.

BACKGROUND OF THE INVENTION

1. Field of the Invention

This invention relates to a spark plug insulator of an internal combustion engine and a method of making the same for use in an automobile and aircraft, and particularly concerns to a spark plug insulator which is improved to be superior in insulation and thermal-shock resistance.

2. Description of Prior Art

In an internal combustion engine, a spark plug insulator is exposed to the ambient temperature as high as 2000° C. at an explosion stroke, and then exposed to an air-fuel mixture which has a temperature equivalent to the atmosphere at an intake stroke. This causes to alternately subject the insulator to a heat-and-cool cycle repeatedly so as to give the insulator repetitive thermal stress. This type of the insulator has been made from a sintered ceramic material with aluminum oxide (alumina) as a main component.

With the recent demand of a high output with a high fuel efficiency of the internal combustion engine, it has been increasingly difficult to cope with an enhanced temperature of the combustion gas which causes a thermal shock on the insulator made of the aluminum oxide based ceramic material. It is found that the thermal shock finally induces cracks on the insulator made of the aluminum oxide based ceramic material depending on bench test conditions.

Therefore, it is an object of the invention to provide a spark plug insulator which is capable of improving a thermal-shock resistance due to repetitive thermal stress so as to prevent cracks on the insulator.

SUMMARY OF THE INVENTION

According to the invention, there is provided a spark plug insulator comprising a sintered body including boron nitride and a metal oxide, the boron nitride of the sintered body being 80 % or exceeding 80% by weight, and the sintered body having a thermal expansion coefficient of less than $5.0\times10^{-6}$/°C.

According further to the invention, there is provided a spark plug insulator wherein a component of the metal oxide is less than 20% by weight, and selected alone or combination from the group consisting of magnesium oxide, calcium oxide, silicon oxide, boron oxide, yttrium oxide and aluminum oxide.

According stillfurther to the invention, there is provided a method of making a spark plug insulator comprising steps of: mixing a powder of boron nitride (BN), an additive and ethanol to form a mixture within a nylon pot mill by means of nylon ball, the boron nitride being 80% or exceeding 80% by weight; drying the mixture for about 10 hours in a vacuum environment; pulverizing the dried mixture so that its grain size is less than 350 μm; forcing the pulverized mixture into a tubular carbon die; sintering the mixture in the carbon die by means of hot press in a nitrogen atmosphere under about 50 MPa at 1800°~1900° C. for 5~10 hours so as to form a boron nitride based compact body; and releasing the boron nitride based compact body from the carbon die.

With the use of the sintered body made of the boron oxide based ceramic which is superior in thermal-shock resistance to the alumina based insulator, it is possible to effectively cope with the increased temperature of the combustion gas which is caused from the recent demand of the high fuel efficiency of the internal combustion engine.

When the component of the boron nitride is less than 80% by weight, an increased dependency on other additives except boron oxide sacrifices the thermal-shock resistance characteristic of the boron nitride based insulator. When the thermal expansion coefficient of the boron nitride based insulator exceeds $5.0\times10^{-6}$/°C., its thermal-shock resistance substantially reduces to that of the alumina based insulator, and thus losing advantages over the alumina based insulator.

With an additive of the metal oxide selected alone or combination from the group consisting of magnesium oxide, calcium oxide, silicon oxide, boron oxide. yttrium oxide and aluminum oxide, it is possible to provide the boron nitride based insulator with a high insulation property.

When the component of the metal oxide exceeds 20% by weight, boron nitride is decomposed to increase unfavorable voids in the sintered body during the process in which boron nitride reacts the metal oxide to form nitrogen oxide gas.

These and other objects and advantages of the invention will be apparent upon reference to the following specification, attendant claims and drawings.

DETAILED DESCRIPTION OF THE EMBODIMENT OF THE INVENTION

Figure 1:
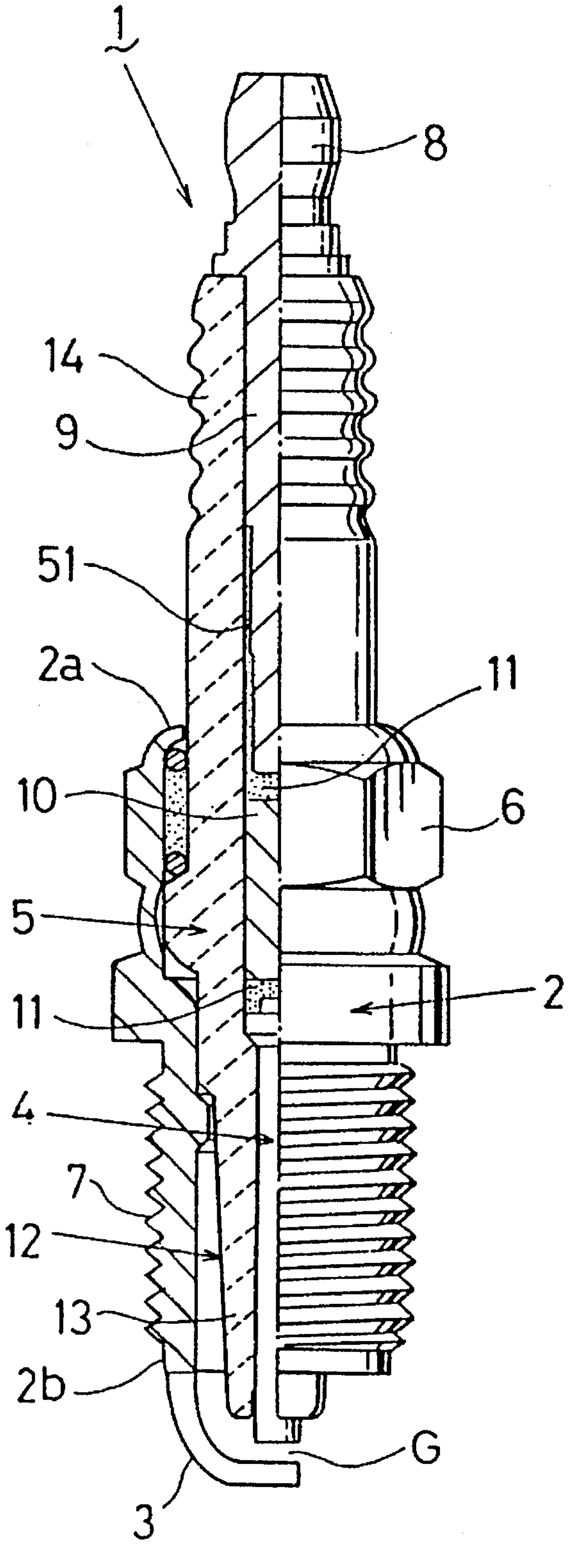
FIG. 1 is a plan view a spark plug according to a first embodiment of the invention, but its left half is sectioned.

Referring to FIG. 1 which shows a spark plug 1 used for an automobile and aircraft engine, the spark plug I has a metallic shell 2, L-shaped ground electrode 3, center electrode 4 and tubular insulator 5. The metallic shell 2 forms an outer structure of the spark plug 1, and works as tools for securing to the engine and supporting the insulator 5. An upper end of the metallic shell 2 forms a hexagonal portion 6 which is used for applying a wrench or the like. A lower end of the metallic shell 2 forms a male thread 7 which is attached to a cylinder head of the engine. To the lower end surface of the metallic shell 2, the ground electrode 3 is secured by means of welding or the like. The electrodes 3, 4 are heat and erosion resistant material made of Ni—Cr—Fe based alloy or Ni—Mn—Si based alloy due to the reason that they are exposed to the high temperature environment of the combustion gas in a combustion chamber of the engine. A spark gap G is provided between a firing end of the ground electrode 3 and a front end of the center electrode 4. A noise-suppressive resistor 10 is disposed between a middle axis 9 of a terminal electrode 8 and the center electrode 4 which the insulator 5 holds within its bore 51. The center electrode 4 is axially aligned by melting a conductive glass sealing powder 11 between the center electrode 4 and the resistor 10 and between the resistor 10 and the middle axis 9. The insulator 5 is supported within the metallic shell 2 by caulking its rear end **2*a*. Integrally with the insulator 5, a leg portion 13 is made at the side which is exposed to the high temperature environment of the combustion gas in a combustion chamber of the engine. With the rear end of the insulator 5, a corrugated portion 14 is integrally provided in which the middle axis 9 of the terminal electrode 8** is enclosed.

The insulator 5 is a sintered body made of boron nitride (BN) and a metal oxide superior in insulation. A component of the boron nitride (BN) is 80% or ecxeeds 80% by weight, and a component of the metal oxide is less than 20% by weight. The boron nitride based insulator 5 has a thermal expansion coefficient less than $5.0\times10^{-6}$/°C. The metal oxide is selected alone or combination from the group consisting of magnesium oxide (MgO), calcium oxide (CaO), silicon oxide ($SiO_2$), boron oxide ($B_2O_3$), yttrium oxide ($Y_2O_3$) and aluminum oxide ($Al_2O_3$).

In making the insulator 5, we employ powder of 99.0% pure boron nitride (BN) (1 μm in average grain size) including ceramic materials consisting of 0.90% $B_2O_3$, 0.02% CaO or the like as impurity substances. As an additive to the powder of the boron nitride (BN), we use MgO, CaO (converted to $CaCO_3$), $SiO_2$, $B_2O_3$, $Al_2O_3$, $Y_2O_3$, $TiO_2$ and $ZrO_2$ alone or in combination as described hereinafter in specimens 1~7 at Table 1. Each of the additive is 99.0% pure, and having an average grain size of less than 1 μm.

Figure 2:
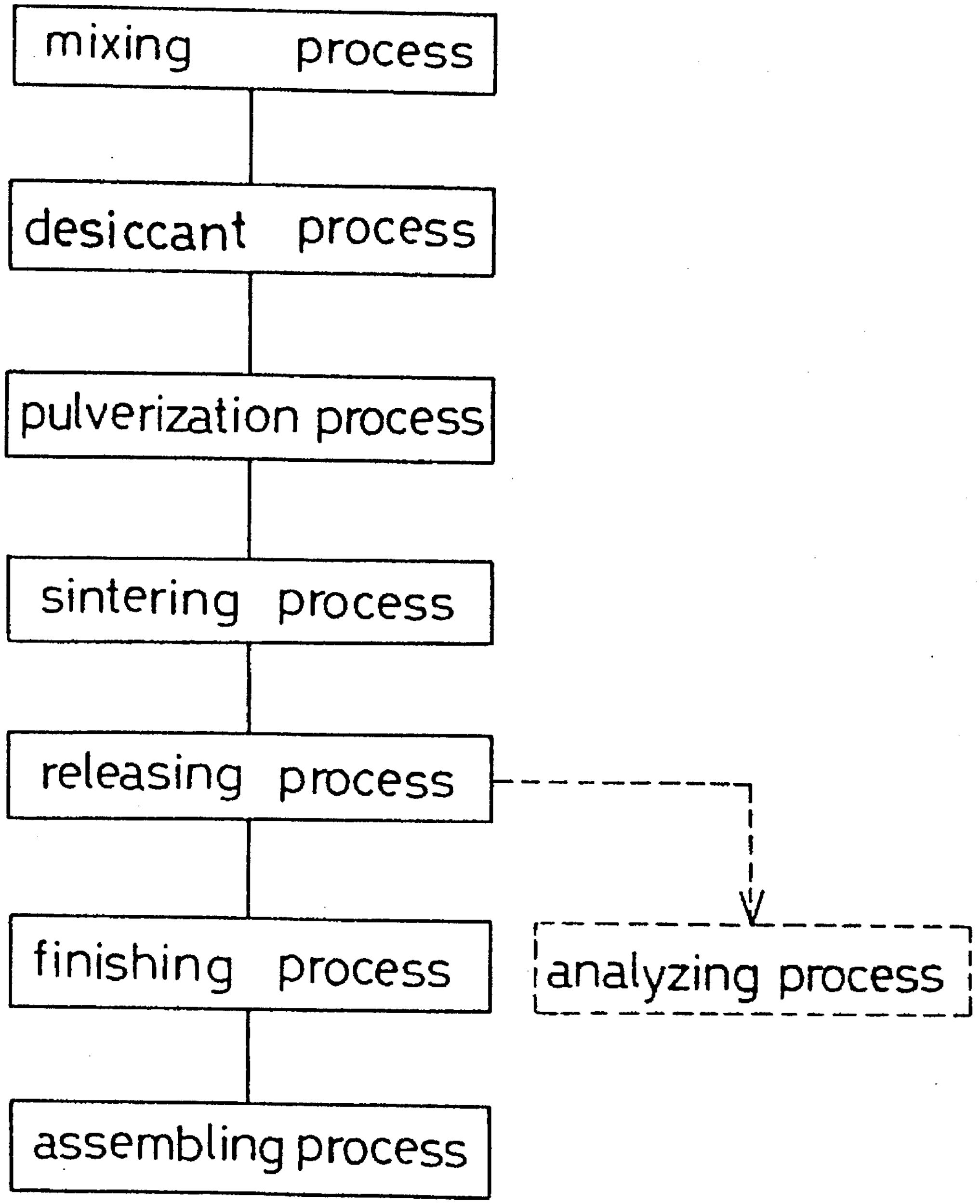
FIG. 2 is a flow chart showing a process how a spark plug insulator is manufactured.

The speciments of the insulator 5 is manufactured as follows:

The powder of the boron nitride (BN), the additive and ethanol are mixed together to form a mixture within a nylon pot mill by means of nylon ball (mixing process in FIG. 2).

Then, the mixture is dried for 10 hours in a vacuum environment (desiccant process in FIG. 2). Thereafter, the dried mixture is pulverized so that its grain size is less than 350 μm (pulverization process in FIG. 2). The pulverized mixture is forced into a tubular carbon die which measures 25 mm in diameter and 100 mm in length. The mixture in the carbon die is sintered by means of hot press in a nitrogen atmosphere under 50 MPa at 1800°~1900° C. for 5~10 hours (sintering process in FIG. 2). The mixture, thus underwent the sintering process, forms a boron nitride based compact body (specimens 1~7 and counterparts 1~5 at Table 1).

Then, the boron nitride based compact body is separated from the carbon die (releasing process). A tiny amount of the compact body is taken out to analyze its components. In the analyzing process, an oxygen component is detected by means of an infrared gas analysis, and CaO, $Y_2O_3$, $Al_2O_3$, MgO or the like are analyzed by means of fluorescent X-ray analysis. By measuring an amount of oxygen component remained after allotting it to the metal oxides, $B_2O_3$ is calculated. The boron nitride (BN) is determined by deducting the metal oxides from the total weight. In each of the specimens, an ignorable amount of carbon is perceived, and therefore, the amount of the carbon is not shown in Table 1.

The the boron nitride based compact body is shaped into the insulator 5 which is suitable for the spark plug 1 (finishing process). After the center electrode 4 is inserted to the insulator 5, the conductive glass sealing powder 11 and the resistor 10 are inserted to the insulator 5. The middle portion of the insulator 5 is heated at 900°~1000° C., and at the same time, the terminal electrode 8 is press fit into the insulator 5 to seal the connection between the rear end of the center electrode 4 and the axis 9. The insulator 5 is placed within the metallic shell 2, to the front end 2b of which the ground electrode 3 is welded (assembling process).

Physical properties of the speciments and the counterparts are compared on the basis of experimental test result shown in Tables 1 and 2.

Table 1 shows the boron nitride (wt %), the additive (wt %), sintering conditions, relative density (%) and appearance of voids in the insulator 5 for the spark plug 1 (specimens 1~7 and counterparts 1~5).

Table 2 shows an engine and measurement test result of a thermal expansion coefficient (/°C.), insulation (MΩ) and thermal-shock resistance (°C.) in the insulator 5 for the spark plug 1 (specimens 1~7 and counterparts 1, 4 and 5). In the counterpart 6, the corresponding physical properties are measured in an alumina-based insulator for a spark plug.

TABLE 1

| No. | boron nitride (BN) (%) | additive | additive (%) | sintering conditions (°C.) | sintering conditions (hr) | relative density (%) | note |
|---|---|---|---|---|---|---|---|
| specimen | | | | | | | |
| 1 | 81.1 | CaO<br>$B_2O_3$ | 14.3<br>4.6 | 1850 | 5 | 97 | |
| 2 | 90.1 | $Y_2O_3$<br>MgO | 7.8<br>2.1 | 1900 | 5 | 98 | |
| 3 | 94.8 | $TiO_2$<br>$B_2O_3$ | 3.9<br>1.3 | 1900 | 10 | 98 | |
| 4 | 98.9 | $B_2O_3$ | 1.1 | 1900 | 10 | 98 | |
| 5 | 98.5 | CaO | 1.5 | 1900 | 10 | 98 | |
| 6 | 99.5 | $B_2O_3$ | 0.5 | 1900 | 10 | 98 | |
| 7 | 93.5 | $SiO_2$<br>$Al_2O_3$ | 5.5<br>1.0 | 1850 | 10 | 97 | |
| counterpart | | | | | | | |
| 1 | 76.6 | CaO<br>$Al_2O_3$ | 5.2<br>18.2 | 1800 | 10 | 96 | increased appearance of voids |
| 2 | 60.0 | $Y_2O_3$<br>$Al_2O_3$ | 9.7<br>30.3 | 1800 | 10 | 92 | increased appearance of voids |
| 3 | 49.9 | $SiO_2$<br>$Al_2O_3$ | 18.9<br>31.2 | 1800 | 10 | 90 | increased appearance of voids |
| 4 | 81.2 | $ZrO_2$<br>$Al_2O_3$ | 14.7<br>4.1 | 1850 | 10 | 95 | |
| 5 | 69.1 | $SiO_2$<br>$Al_2O_3$ | 9.6<br>21.3 | 1800 | 5 | 94 | |

TABLE 2

| No. | thermal expansional coefficient (/°C.) | insulation (MΩ) | thermal shock resistance (°C.) | engine test |
|---|---|---|---|---|
| specimen | | | | |
| 1 | $4.1 \times 10^{-6}$ | 1000 | 380 | good |
| 2 | $2.4 \times 10^{-6}$ | 1800 | 650 | good |
| 3 | $3.8 \times 10^{-6}$ | 20 | 800 | misfire |
| 4 | $1.2 \times 10^{-6}$ | >10000 | >1000 | good |
| 5 | $1.8 \times 10^{-6}$ | 9500 | 1000 | good |
| 6 | $1.5 \times 10^{-6}$ | >10000 | >1000 | good |
| 7 | $2.0 \times 10^{-6}$ | 800 | 700 | good |
| counterpart | | | | |
| 1 | $3.2 \times 10^{-6}$ | 1200 | 280 | no good |
| 4 | $6.0 \times 10^{-6}$ | 200 | 280 | no good |
| 5 | $4.6 \times 10^{-6}$ | 250 | 230 | no good |
| 6 | $7.8 \times 10^{-6}$ | 600 | 200 | no good |

Where, the relative density (%) is estimated by (apparent density)/(calculated density). The structural observation of the insulator specimens is carried out by using SEM (Scanning Type Electronic Microscope). The thermal expansion coefficient of the insulator specimens is measured between 25° C. (room temperature) and 1000° C. in the nitrogen atmosphere by using a push-pull type thermal expansional meter.

With the use of an insulation resistor meter 1000 V), the insulation is estimated by measuring the resistance between the ground electrode and the terminal electrode, while at the same time, heating the speciments at 500° C. in the nitrogen atmosphere.

The thermal-shock resistance is estimated on the basis of a difference between the water temperature (20° C. and each temperature of the speciments in which cracks occur by shaping the specimens 1~7 and the counterparts 1, 4, 5 and 6 into an elongation (φ20 mm×20 mm) which are respectively dipped into water after taking them out of a heated furnace (180°~1000° C.).

An experimental engine test is carried out with the speciments mounted on a four-cycle, single cylinder engine. With the passage of five minutes after a heated portion 12 of the insulator reaches the temperature in whic preignition occurs, it is investigated whether or not cracks occur on the specimens 1~7 and the counterparts 1, 4, 5 and 6. Depending on whether or not the cracks occur, the engine condition is represented by good or no-good as shown in Table 2.

As apparently confirmed from the above investigation, an increased appearance of voids is observed in the texture of the counterparts 1~3 since they contain the boron nitride (BN) in less than 80% by weight. In particular, it is found that the specimens 1 and 5 are inferior in thermal-shock resistance on which the cracks occur in the experimental engine test.

The counterpart 4 has a thermal expansion coefficient of 6.0×10–⁶/°C. which is greater than that of the specimens 1~7. This causes cracks in the experimental engine test although the counterpart 4, which has the boron nitride of more than 80% by weight, is superior in thermal-shock resistance to the counterpart 6.

The specimen 3 is as low as 20 MΩ in insulation property due to the addition of $TiO_2$, and induces a misfire by electrical leakage when starting the engine.

As evident from the foregoing description, it is possible to obtain an insulator superior in thermal-shock resistance to the alumina based insulator by using the sintered body made of the boron nitride based ceramic being 80% or exceeding 80% by weight, and the metal oxide less than 20% by weight with its thermal expansion coefficient less than $5.0\times10^{-6}$/°C. This makes it possible to substantially improve the thermal-shock resistance caused from the repetitive thermal stress so as to effectively cope with the increased temperature of the combustion gas which is caused from the recent demand of the high fuel efficiency of the internal combustion engine.

Figure 3:
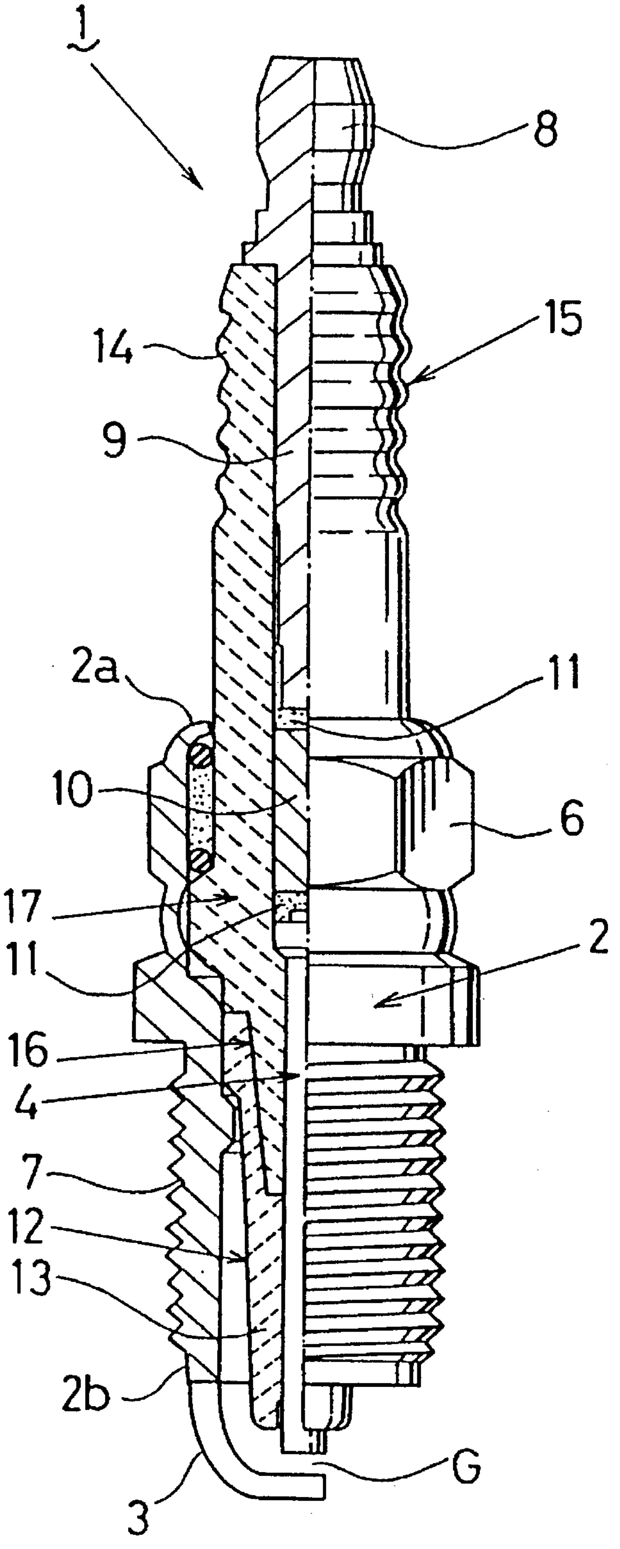
FIG. 3 is a plan view a spark plug according to a second embodiment of the invention, but its left half is sectioned.

FIG. 3 shows a second embodiment of the invention in which a two-part type insulator 15 is placed in the metallic shell 2 of the spark plug 1. The two-part type insulator 15 includes the leg portion 13 and an alumina-based ceramic body 17 secured to the leg portion 13 by means of mortise-tenon joint. The leg portion 13 is made of a boron nitride based ceramic body 16, and positioned at the side of the heated portion 12. A rear end of the alumina-based ceramic body 17 has a corrugated portion 14. In the second embodiment of the invention, it is cost-effective particularly when putting the spark plug insulator into mass production by providing the leg portion 13 with the boron nitride based ceramic body 16.

While the invention has been described with reference to the specific embodiments, it is understood that this description is not to be construed in a limiting sense in as such as various modifications and additions to the specific embodiments may be made by skilled artisan without departing from the spirit and scope of the invention.

What is claimed is:

1. A method of making a spark plug insulator comprising steps of:

mixing a powder of boron nitride (BN), an additive and ethanol to form a mixture within a nylon pot mill by means of nylon ball, the boron nitride being 80% or exceeding 80% by weight;

drying the mixture for about 10 hours in a vacuum environment;

pulverizing the dried mixture so that its grain size is less than 350 μm; forcing the pulverized mixture into a tubular carbon die;

sintering the mixture in the carbon die by means of hot press in a nitrogen atmosphere under about 50 MPa at 1800°~1900° C. for 5~10 hours so as to form a boron nitride based compact body; and releasing the boron nitride based compact body from the carbon die.

2. A method of making a spark plug insulator as recited in claim 1, wherein the additive is less than 20% by weight, and selected alone or combination from the group consisting of magnesium oxide, calcium oxide, silicon oxide, boron oxide, yttrium oxide and aluminum oxide.

* * * * *